(12) United States Patent
Mildner et al.

(10) Patent No.: US 8,657,369 B2
(45) Date of Patent: Feb. 25, 2014

(54) DIAGONAL REINFORCEMENT FOR A MOTOR VEHICLE FLOOR STRUCTURE

(75) Inventors: Udo Mildner, Limburg (DE); Stanislaw Klimek, Frankfurt am Main (DE); Karsten Bohle, Bad Schwalbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/454,138

(22) Filed: Apr. 24, 2012

(65) Prior Publication Data

US 2012/0274100 A1 Nov. 1, 2012

(30) Foreign Application Priority Data

Apr. 29, 2011 (DE) .......................... 10 2011 018 951

(51) Int. Cl.
*B62D 25/20* (2006.01)
(52) U.S. Cl.
USPC ...................................... 296/204; 296/193.07
(58) Field of Classification Search
USPC ............................................ 296/204, 193.07
See application file for complete search history.

(56) References Cited

U.S. PATENT DOCUMENTS

| | | | |
|---|---|---|---|
| 213,540 | A | 3/1879 | Bailey |
| 6,981,736 | B2 | 1/2006 | Morsch et al. |
| 8,128,154 | B2 * | 3/2012 | Egawa et al. ............. 296/187.12 |
| 8,398,158 | B2 * | 3/2013 | Mildner et al. .......... 296/193.07 |
| 2010/0026052 | A1 | 2/2010 | Mendoza et al. |
| 2010/0066125 | A1 | 3/2010 | Egawa et al. |

FOREIGN PATENT DOCUMENTS

| | | |
|---|---|---|
| DE | 765683 C | 9/1953 |
| DE | 914824 C | 7/1954 |
| DE | 19860032 A1 | 6/2000 |
| DE | 10232841 A1 | 2/2004 |
| DE | 102008036338 A1 | 2/2010 |
| DE | 102010039109 A1 | 2/2012 |
| EP | 1741619 A1 | 1/2007 |
| JP | 2006264541 A | 10/2006 |

OTHER PUBLICATIONS

UK IPO, British Search Report for Application No. 1205817.8, dated Jul. 6, 2012.
German Patent Office, German Search Report dated Dec. 6, 2011 for German Application No. 102011018951.3.

* cited by examiner

*Primary Examiner* — Dennis Pedder
*Assistant Examiner* — Beverly Becker
(74) *Attorney, Agent, or Firm* — Ingrassia Fisher & Lorenz, P.C.

(57) ABSTRACT

A floor structure of a motor vehicle body is provided. The floor structure has two frame rail arrangements essentially extending in the longitudinal direction of the motor vehicle body. The arrangements are joined together by a cross member essentially extending in the transverse direction of the motor vehicle body. A floor panel extends between the cross member and the two frame rail arrangements. A diagonal reinforcement is located above the floor panel and abuts against the cross member in the longitudinal direction of the motor vehicle body. A reinforcing element essentially extends in the longitudinal direction of the motor vehicle body between the two frame rail arrangements. The diagonal reinforcement abuts against the reinforcing element in the transverse direction of the motor vehicle body.

15 Claims, 11 Drawing Sheets

B-B

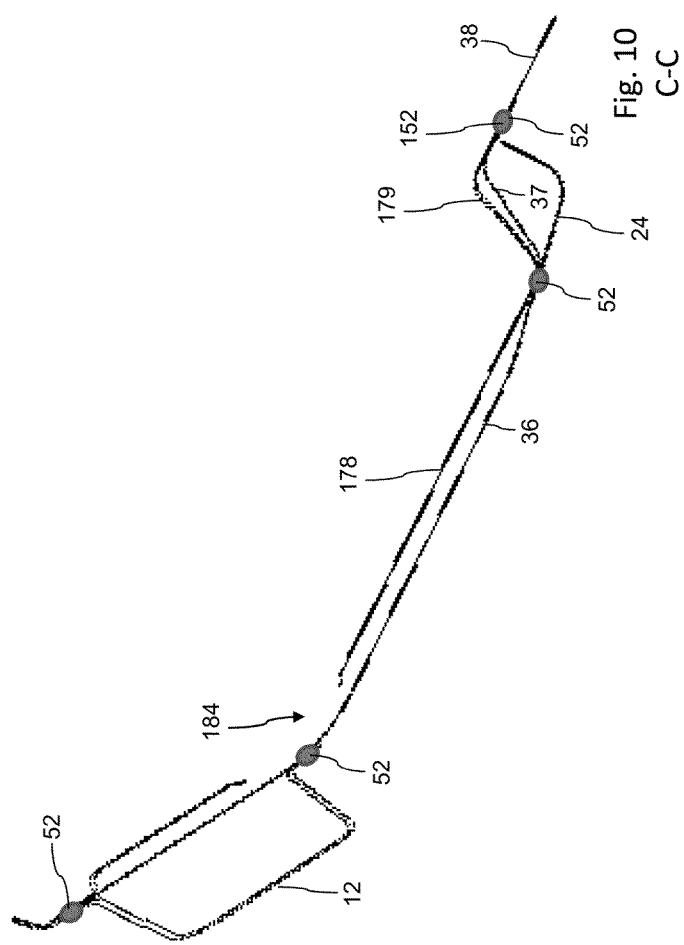

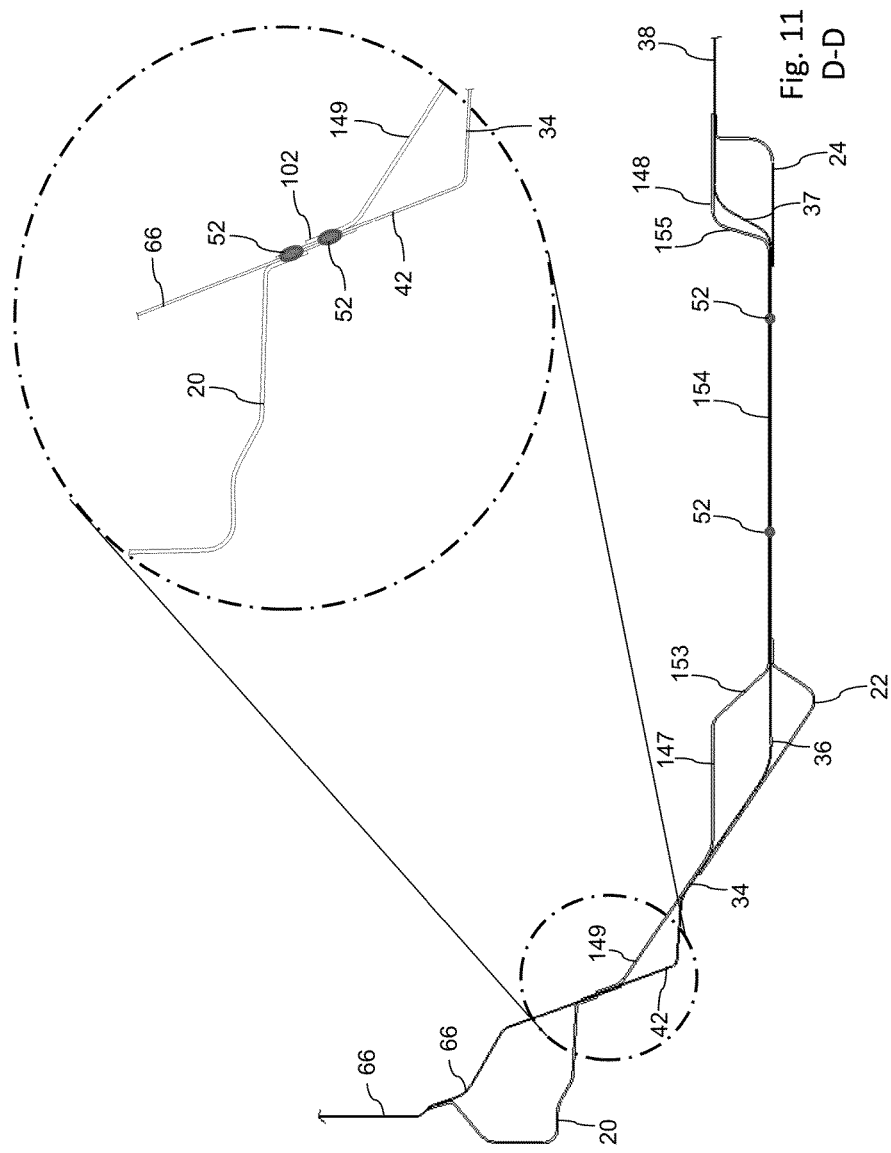

DIAGONAL REINFORCEMENT FOR A MOTOR VEHICLE FLOOR STRUCTURE

CROSS-REFERENCE TO RELATED APPLICATION

This application claims priority to German Patent Application No. 10 2011 018 951.3, filed Apr. 29, 2011, which is incorporated herein by reference in its entirety.

TECHNICAL FIELD

The technical field generally relates to a floor structure of a motor vehicle body with a floor panel and several cross members spaced apart in the longitudinal direction of the vehicle, wherein a diagonal reinforcement is further provided for stabilizing the floor structure.

BACKGROUND

Different concepts for floor and underfloor structures are known in motor vehicle body construction. Two lateral frame rail arrangements are most often provided in the area of the passenger cabin, and are joined together by means of individual cross members running in the transverse direction of the vehicle. A support frame made of these components can further be provided with a floor panel, which largely fills out the gap between the frame rails or cross members.

A transmission hump is most often to be provided centrally between the frame rail structures, which is either integrated as a single piece into the floor panel, or adjoined by individual floor panel sections separately joined with the transmission hump, in particular given a floor panel comprised of multiple parts.

For example, DE 102 32 841 A1 discloses a floor beam arrangement with a front floor cross member and two rocker panels arranged to the side of the vehicle body. Frame rails run between the rocker panels, and for their part proceed from the front end, extending toward the back under a floor panel that closes off the passenger cabin from below. A large profile cross section of the frame rails here abuts an end plate of the front floor cross member, after which a comparatively smaller profile cross section thereof runs under the floor panel, vertically offset.

Such frame rail arrangements comprised of frame rails and frame rail extensions typically are vertically offset in the longitudinal direction of the vehicle. Both during a laterally offset frontal collision and in the course of a pole test, which involves simulating the lateral impact of a motor vehicle against a tree, the longitudinal frame or rocker panel profile adjoining the latter can be exposed to considerable deformation, which is inwardly directed toward the passenger cabin. In addition, the frame rail arrangement can exhibit a tendency to tilt and also turn into the passenger cabin given its varying height profile in the longitudinal direction of the vehicle.

By contrast, it is at least one object herein to provide a floor structure of a motor vehicle body with an improved structural rigidity and mechanical stability, which can possibly even be manufactured with a reduced body or vehicle weight. In addition, the floor structure is to enable an effective utilization of the installation space present in the floor or underfloor region of the motor vehicle, in particular the space-saving accommodation of other functional parts and vehicle components. The floor structure is also intended to improve the torsional and twisting stiffness of the vehicle body itself. In addition, other objects, desirable features and characteristics will become apparent from the subsequent summary and detailed description, and the appended claims, taken in conjunction with the accompanying drawings and this background.

SUMMARY

A floor structure for a motor vehicle body is provided, which exhibits at least two frame rail arrangements essentially extending in the longitudinal direction of the vehicle. The two frame rail arrangements are joined together by means of a cross member essentially extending in the transverse direction of the vehicle, e.g., by means of a bulkhead cross member. The floor structure further exhibits a floor panel, which extends between the cross member and the two frame rail arrangements.

The two frame rail arrangements are here spaced apart from each other in the transverse direction of the vehicle (y), and essentially run parallel to each other. Also provided to reinforce the floor structure is at least one diagonal reinforcement located above the floor panel, and hence in the vehicle interior. The diagonal reinforcement abuts against the cross member viewed in the longitudinal direction of the vehicle (x), and against a reinforcing element viewed in the transverse direction of the vehicle (y), which essentially extends in the longitudinal direction of the vehicle between the two frame rail arrangements.

The reinforcing element here preferably runs parallel to the longitudinal direction of the vehicle (x), and is provided roughly midway between the two frame rail arrangements above the floor panel. At least sections of the diagonal reinforcement run diagonally in the x-y plane of the motor vehicle. It is preferably structurally connected with a bulkhead cross member lying in front of the passenger cabin, and can divert any transverse forces that outwardly or laterally act on the bulkhead cross member or the frame rail connected thereto to the inside, toward the middle of the vehicle, in the reinforcing element that essentially runs in the longitudinal direction of the vehicle.

Because the diagonal reinforcement is situated on the inside, meaning above the floor panel in the wet and dry area of the vehicle, separate corrosion-inhibiting measures need not be taken for the diagonal reinforcement.

In a first embodiment, the diagonal reinforcement and the reinforcing element running about centrally between the frame rails in the longitudinal direction of the vehicle are secured to the floor panel. The mentioned components are preferably permanently bonded to each other. The diagonal reinforcement, reinforcing element and floor panel can be joined in particular through welding, riveting, adhesive bonding or clinching. In this regard, the floor structure components that come to abut each other are provided with mutually coordinated attachment flange sections, along which the components, diagonal reinforcement, reinforcing element and floor panel abut each other and are secured to each other as extensively as possible.

In another preferred embodiment, the diagonal reinforcement exhibits a front attachment flange essentially extending in the transverse direction of the vehicle, which is structurally connected with the cross member, preferably a bulkhead cross member. Structural connection denotes a connection that is able to convey acting mechanical forces over the respective connection. In the present case, the diagonal reinforcement is structurally connected with the bulkhead cross member and/or at the other end with the reinforcing element in order to establish a load path along which forces externally introduced into the body can be conveyed.

In an embodiment, the diagonal reinforcement facing the bulkhead cross member is structurally connected with the bulkhead cross member as far outside as possible, if necessary adjoining the frame rail arrangement. Already before or just as the frame rail in the bulkhead cross member area is subjected to an inwardly directed mechanical deformation during exposure to a load, corresponding mechanical loads can in this way be diverted via the diagonal reinforcement toward the middle of the vehicle, in particular into the reinforcing element provided there.

The diagonal reinforcement can also additionally brace the frame rail and bulkhead cross member against twisting, so that a force acting in a diagonal direction on the front floor structure can be more effectively absorbed and diverted. In addition, the diagonal reinforcement can also prevent the frame rail arrangement from potentially becoming upended in the area where connected to the vehicle bulkhead given a laterally offset collision, or at the very least diminish such deformations.

Of course, the diagonal reinforcement is able not least to improve and structurally reinforce the deformation behavior of the floor panel and foot well in the area of the vehicle bulkhead. In addition, any intrusions into the foot well can be reduced by means of the diagonal reinforcement.

In another preferred embodiment, the diagonal reinforcement exhibits a rear or laterally inwardly directed attachment flange, which essentially extends in the longitudinal direction of the vehicle, and which serves to structurally connect the diagonal reinforcement with the reinforcing element essentially extending in the longitudinal direction of the vehicle. In other words, the diagonal reinforcement abuts the bulkhead cross member in the longitudinal direction of the vehicle toward the front, while relative to the transverse direction of the vehicle, it inwardly abuts a central reinforcing element running in the longitudinal direction. By no means does the structural connection between the diagonal reinforcement and adjoining structural components of the motor vehicle body require that the respective components be directly joined with each other.

For example, in the connecting region to the bulkhead cross member, the floor panel can come to lie between the bulkhead cross member and the diagonal reinforcement. In order to mutually secure the diagonal reinforcement, floor panel and bulkhead cross member, for example, triple weld spots or comparable joining processes are provided. In order to structurally connect the diagonal reinforcement and bulkhead cross member in such a way as to transfer the load path, it is enough that the mentioned components sufficiently overlap or cover each other in the direction of a potentially arising load path.

In another preferred embodiment, the diagonal reinforcement can further exhibit a rear attachment flange essentially extending in the transverse direction of the vehicle, which once it reaches a final assembly position on the floor structure abuts a seat cross member and/or is structurally connected thereto. As a consequence, the diagonal reinforcement can adjoin a connecting area between the reinforcing element and seat cross member, for example. The rear end section of the diagonal reinforcement can also be directly supported in the longitudinal direction of the vehicle.

It is provided that the diagonal reinforcement proceed from a front linking region adjoining the bulkhead cross member and extend rearward, opposite the traveling direction of the vehicle, toward the middle of the vehicle. The diagonal reinforcement can here essentially follow a straight line, but be correspondingly aligned diagonally to the frame rails or cross members on the floor panel, and secured thereto.

In another embodiment, the diagonal reinforcement is further adjusted to the contour of the floor panel. The floor panel can exhibit a largely flat contour in the area of a front foot well section, but ascend toward the bulkhead. In order to reinforce the floor panel, it is here provided in particular that the diagonal reinforcement traces the contour of the floor panel, and is largely joined with the floor panel over its entire diagonal extension.

In another embodiment, the shape of the floor panel and the diagonal reinforcement running diagonally in the x-y plane can here at least regionally also yield a bent or curved contour for the diagonal reinforcement that is inwardly directed toward the middle of the vehicle.

In another embodiment, the diagonal reinforcement exhibits at least one profile section that is downwardly open toward the floor panel and traces the contour of the diagonal reinforcement. The profile section preferably extends over the entire longitudinal or diagonal extension of the diagonal reinforcement. It is preferably configured with a top-hat profile or twin-top-hat profile. Several profile sections running roughly parallel to each other can also be provided on the diagonal reinforcement. The at least one profile section provided in the diagonal reinforcement can impart an elevated structural or torsional rigidity to the diagonal reinforcement itself.

In addition, the diagonal reinforcement can be connected on either side of the profile section with a floor panel lying thereunder. In this regard, the floor panel provides a strike plate for the profile section of the diagonal reinforcement.

In another embodiment, the diagonal reinforcement exhibits lateral and outwardly protruding and/or circumferential attachment flange sections, which can be secured directly to the floor panel with the diagonal reinforcement in the assembly position. Joining procedures that yield flush bonds are also preferred for this purpose, e.g., spot or laser welding.

A further embodiment can also provide that the diagonal reinforcement exhibit an opening or recess in at least one surface section that comes into contact with the floor panel. Individual recesses can here serve to reduce the weight of the diagonal reinforcement. Openings can further be provided to separately join, in particular weld, the floor panel itself with underlying bearing structure components, such as the frame rails or cross members.

The openings or recesses here do not absolutely have to be provided in the surface sections of the diagonal reinforcement that come into contact with the floor panel. They can also be formed in profile sections of the diagonal reinforcement that are elevated by comparison to the floor section.

Another preferred embodiment provides at least two diagonal reinforcements arranged essentially symmetrical to the reinforcing element, which are configured symmetrically to each other in relation to a central longitudinal axis of the floor structure or motor vehicle body, and correspondingly also secured to the floor structure symmetrically to each other.

It can further be provided that the reinforcing element against which the diagonal reinforcements abut in the transverse direction of the vehicle be designed as a transmission hump integrated into the floor panel or as a reinforcing element separately attached to the floor panel. The floor panel can here be essentially free of any transmission hump in the front foot well area, which is possible in particular in vehicles with a comparatively high foot well, for example sport utility vehicles or multiple purpose vehicles.

The comparatively high position of the floor panel makes it possible to also situate additional vehicle components underneath the seat linking area of the floor panel in an especially space-saving manner, such as the fuel tank or vehicle batteries or accumulators.

It can also be provided that a one-piece floor panel that extends largely continuously between the bulkhead linkage and heel panel be furnished, which also extends in the transverse direction of the vehicle as a single piece and continuously between the lateral frame rail arrangements. In order to structurally reinforce the floor panel, in particular in the foot well area of the floor panel, a separate reinforcing element can here be provided, which is structurally connected with the bulkhead cross member or front bottom beam on the one hand, and with a seat cross member on the other.

Another preferred embodiment can also provide that the at least one diagonal reinforcement and the reinforcing element itself be designed as a single piece, wherein the diagonal reinforcement and the reinforcing element that comes to lie centrally in the vehicle form a reinforcement structure that can be placed on the floor panel from above, and structurally connected with the floor panel as well as with a bulkhead cross member and a seat cross member situated behind the latter.

Two diagonal reinforcements arranged roughly in the shape of a V relative to each other when projected in the x-y plane are here also connected with the reinforcing element essentially extending in the longitudinal direction of the vehicle or configured as a single piece therewith.

From the standpoint of assembly technology, the two diagonal reinforcements can be connected in advance with the reinforcing element lying in between, so that the reinforcement structure formed by the two diagonal reinforcements and the reinforcing element are joined as one unit on the underlying floor panel and on the adjoining bearing structure components during the final assembly of the motor vehicle. In particular given a one-piece design of the reinforcing element and diagonal reinforcements, it can be provided that a sheet metal blank be configured in advance in a predetermined manner, for example in embossing, stamping or deep drawing operations.

It is further conceivable that the diagonal reinforcements themselves spaced apart from each other and the reinforcing element lying in between be joined to each other in a linking area to the bulkhead cross member by means of a shared front linking flange. This makes it possible to further increase the structural rigidity and stability of the reinforcement structure.

Further provided in another embodiment, is a motor vehicle body with a floor structure described above along with a correspondingly configured motor vehicle, in particular a sport utility vehicle or a multiple purpose vehicle, which each exhibit a floor structure as described above.

DETAILED DESCRIPTION OF THE DRAWINGS

The present invention will hereinafter be described in conjunction with the following drawing figures, wherein like numerals denote like elements, and wherein:

FIG. 10 is a cross section along C-C according to FIG. 7; and

FIG. 11 is another cross section along D-D according to FIG. 7.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In an exemplary embodiment, the floor structure 10 shown in part only regionally on FIGS. 1 to 11 exhibits two lateral frame rail arrangements spaced apart from each other in the transverse direction of the vehicle (y). In the area of a bulkhead cross member 20 that joins the frame rail arrangements, the front frame rails 12, 14 transition into front frame extensions 16, 18 that run toward the rear, opposite the traveling direction.

Figure 5:
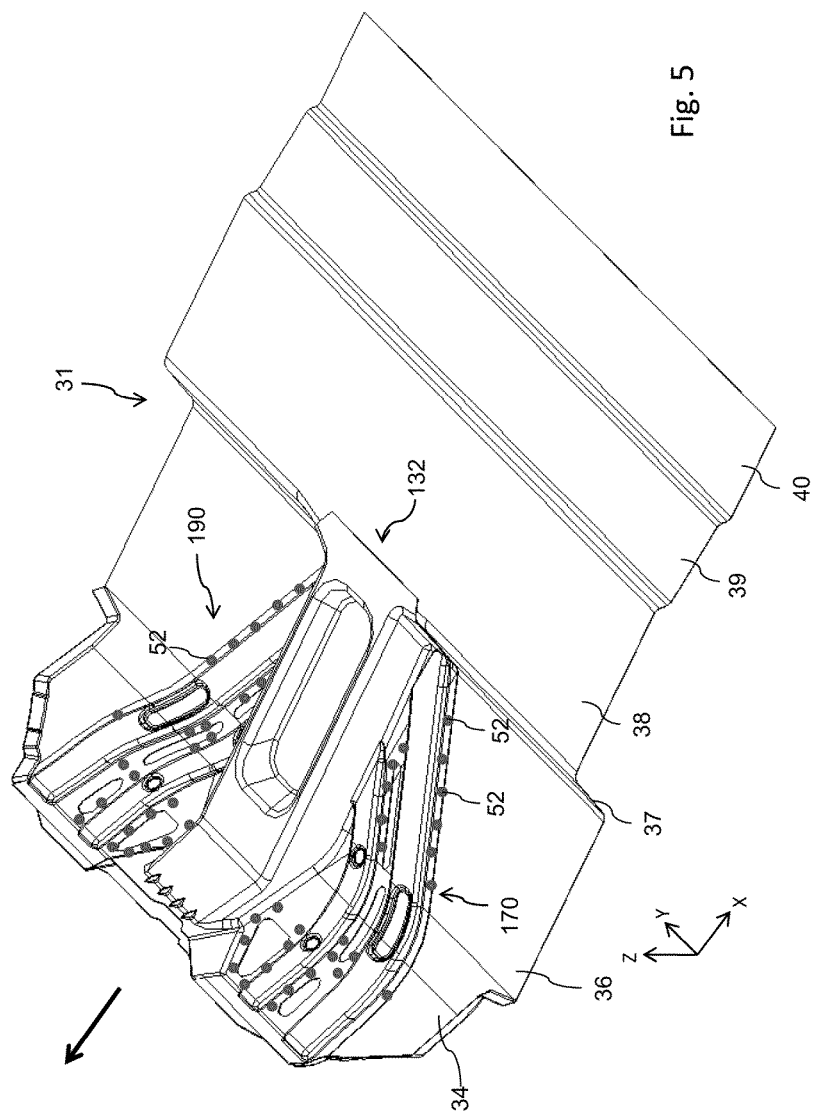
FIG. 5 is the reinforcement structure according to FIG. 4 in the installation position on a floor panel in accordance with an exemplary embodiment.
Figure 6:
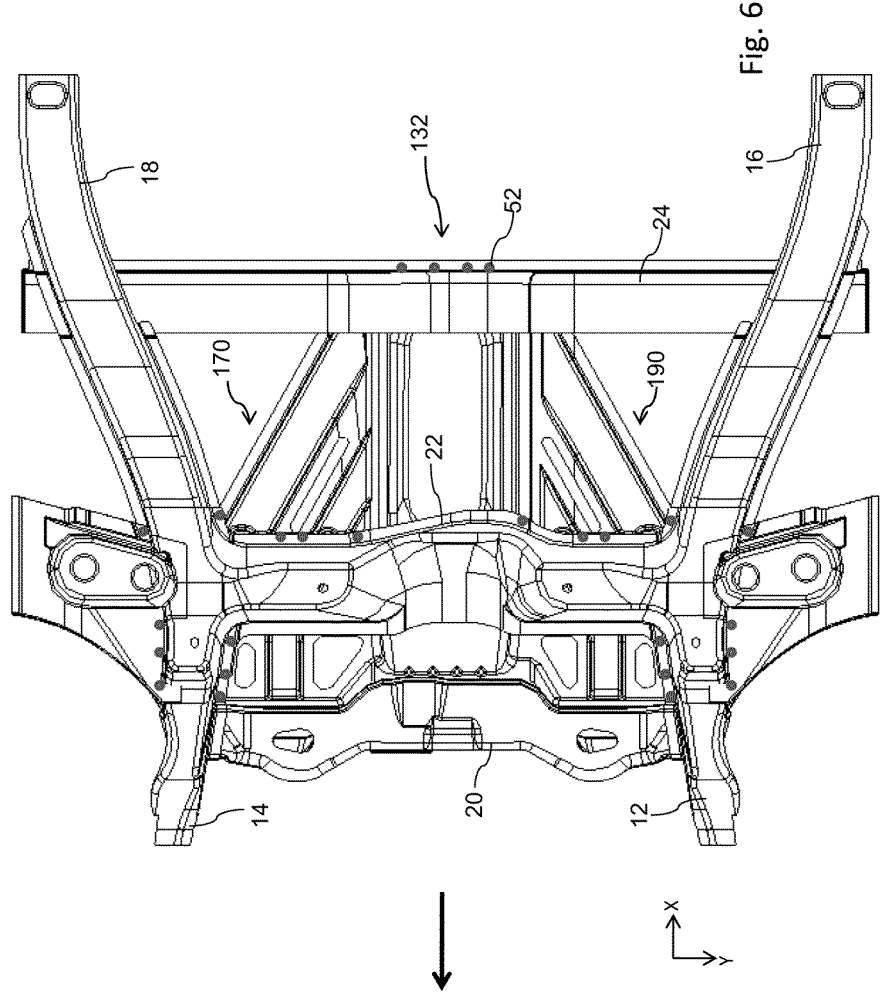
FIG. 6 is the floor structure with reinforcement structure arranged thereupon, viewed from below.
Figure 7:
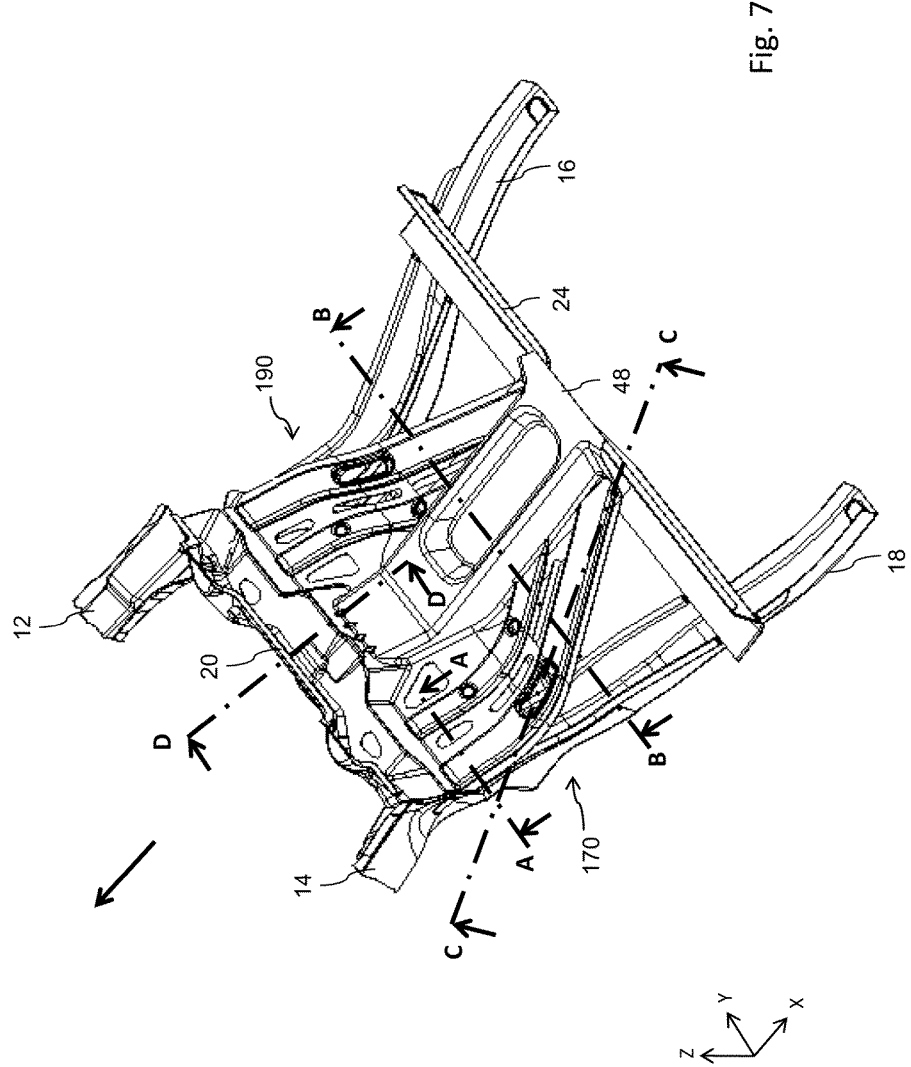
FIG. 7 is a reinforcement structure separately arranged on the support frame of the body in a perspective according to FIG. 5.

As illustrated on FIGS. 6 and 7, these support structure components 16, 18 with a U-shaped profile and labeled as frame rails for the sake of simplicity are connected with a total of three cross members spaced apart from each other in the longitudinal direction of the vehicle (x), specifically with a bulkhead cross member 20, a front floor cross member 22 and a seat cross member 24. The seat cross member 24 is here situated above the frame rail 16, 18, and together with the floor panel 30 or 31 separately depicted on FIGS. 1 and 5 that comes to lie over it forms a seat linking section 38 that is elevated by comparison to a foot well 36.

Figure 1:
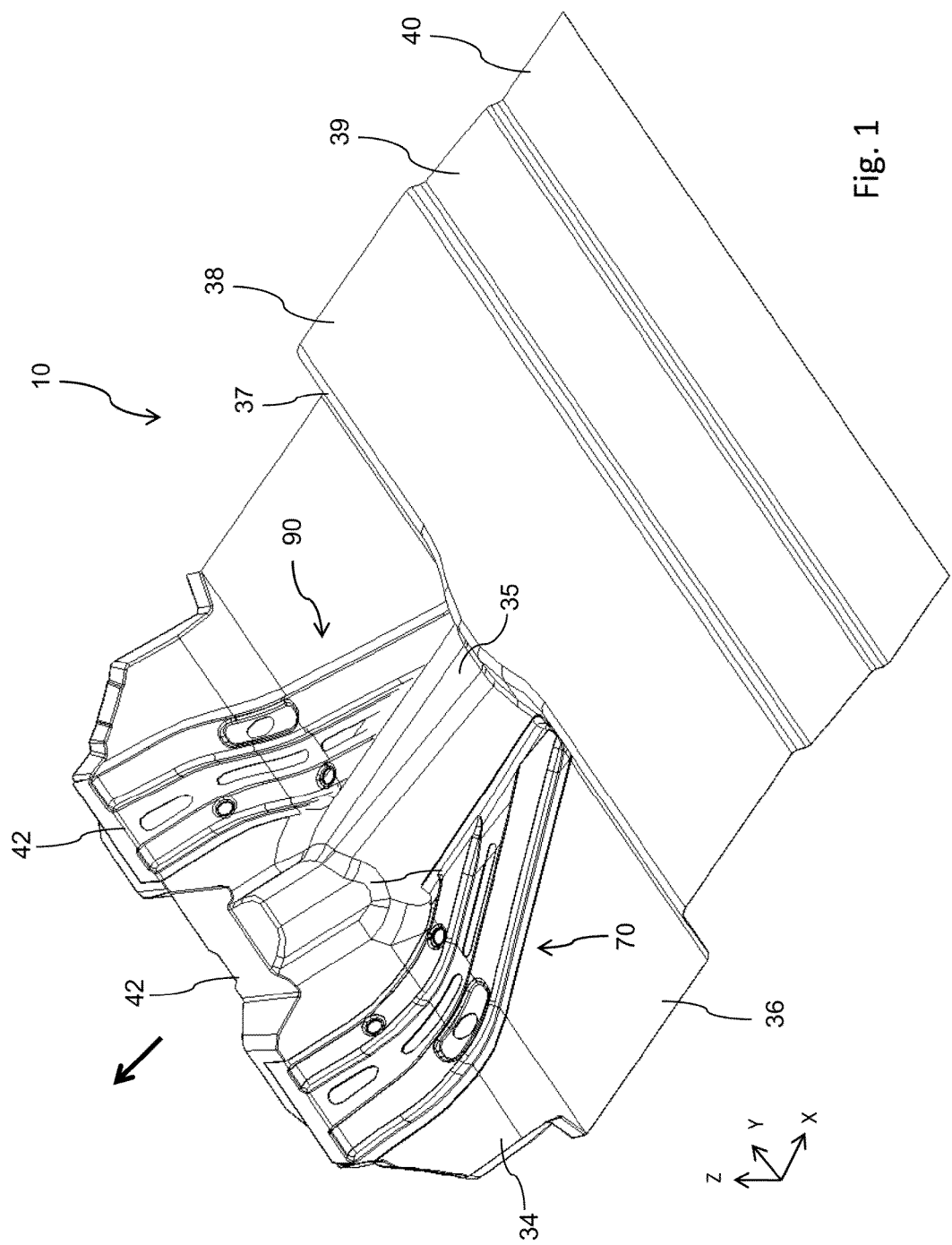
FIG. 1 is a perspective view of a floor panel in accordance with an exemplary embodiment.

In an embodiment, the floor panel 30, 31 shown in particular on FIGS. 1 and 5 is designed as a single piece running continuously in both the longitudinal direction (x) and transverse direction (y) of the vehicle, and exhibits individual partial areas that merge into each other, for example in the longitudinal direction of the vehicle (x), e.g., a bulkhead section 34 that projects upwardly inclined toward the front, a front foot well section 36, a transitional area 37 adjoining the latter and running upwardly inclined toward the back, as well as an elevated seat linking area 38 adjoining the latter.

Further toward the back, opposite the traveling direction denoted with the arrow on the figures, the floor panel 30, 31 incrementally transitions into a rear foot well section 40 for back seat passengers by way of a shoulder 39. In relation to the vertical direction of the vehicle (z), the rear foot well section 40 here lies at a somewhat higher level than the front foot well section 36.

In an embodiment, the two floor panels 30, 31 shown separately on FIGS. 1 and 5 differ in terms of their reinforcement structure 32, 35 located roughly centrally in the front foot well section 36. While the floor panel 30 shown on FIG. 1 exhibits a tunnel structure 35 that is curved in the region of the front foot well section 36 and integrated into the floor panel, the floor panel 30 depicted on FIG. 5 is largely free of a transmission hump and largely flat in the foot well section 36.

Provided there in place of a transmission hump 35 to reinforce the floor panel 30 is a reinforcing element 32, which as shown on FIG. 7 can be structurally connected both with the seat cross member 24 and the front cross members 20, 22 situated upstream in the traveling direction. The reinforcing element 32 is here located completely inside the motor vehicle. It is above the floor panel 31.

In an embodiment, the reinforcing element 32 shown on FIG. 5 is downwardly sealed away from the underlying foot well section 36 of the floor panel 31. The reinforcing element 32 here not so much forms a cavity to accommodate functional parts of the motor vehicle, but rather serves exclusively or predominantly to structurally reinforce the floor panel 31 in the front foot well area.

Figure 3:
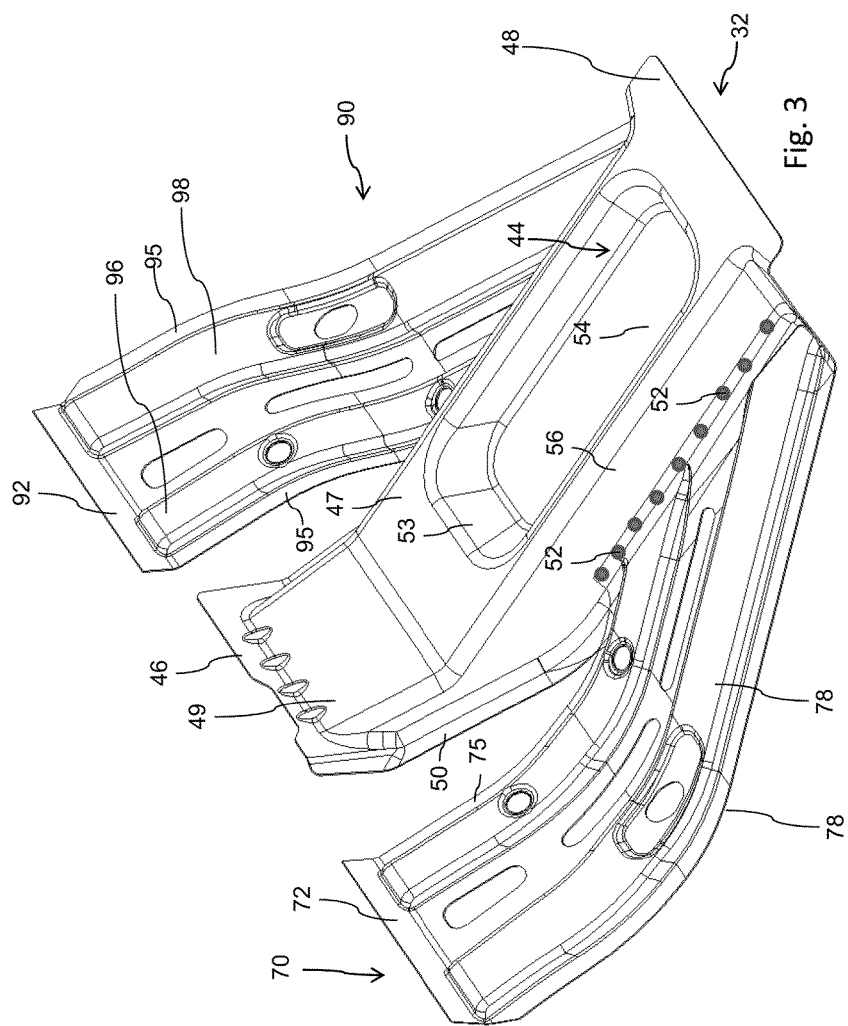
FIG. 3 is a reinforcement structure with two diagonal reinforcements and a reinforcing element situated centrally thereto in accordance with an exemplary embodiment.

FIG. 3 further shows a trough-like structure of the reinforcing element 32. The latter exhibits a trough-like depression 44 with a trough floor 54 in the area of the essentially flat foot well section 36 of the floor panel 31. Above the trough floor 54, the reinforcing element 32 again is separately joined to the underlying foot well section 36 of the floor panel 31.

Toward the back, facing the seat cross member 24, the reinforcing element 32 exhibits a linking extension 48 that is roughly flush with the upper side of the top-hat profile, and once a final assembly configuration has been reached comes to lie on the transitional section 37 of the floor panel 31 in the area of the seat cross member 24.

In an embodiment, the trough area 44 is laterally bordered by two edge profiles 60, 62 shaped like humps, which transition into an essentially flat profile section 47 toward the front, pointing in the traveling direction. In the transitional area to the bulkhead linkage, the essentially horizontally aligned profile section 47 transitions into a profile section 49 inclined upwardly toward the front, which ultimately empties into the approximately vertically oriented linking flange 46 of the reinforcing element 32. In particular, the elevated position of the floor panel 31 above the cross member 20, 22, 24 as well as above the two cross members 16, 18 eliminates the need for a transmission hump in the front foot well section 36.

Regardless of whether the floor panel 30, 31 is provided with a transmission hump 35 according to FIG. 1 or some other kind of reinforcing element 32 according to FIG. 5, the floor structure exhibits at least one, preferably two diagonal reinforcements 70, 90, which abut the bulkhead cross beam 20 in the longitudinal direction of the vehicle (x) on the one hand, and on the reinforcing element 35, 32 coming to lie roughly centrally between the frame rails 16, 18 in the transverse direction of the vehicle (y) on the other.

Figure 2:
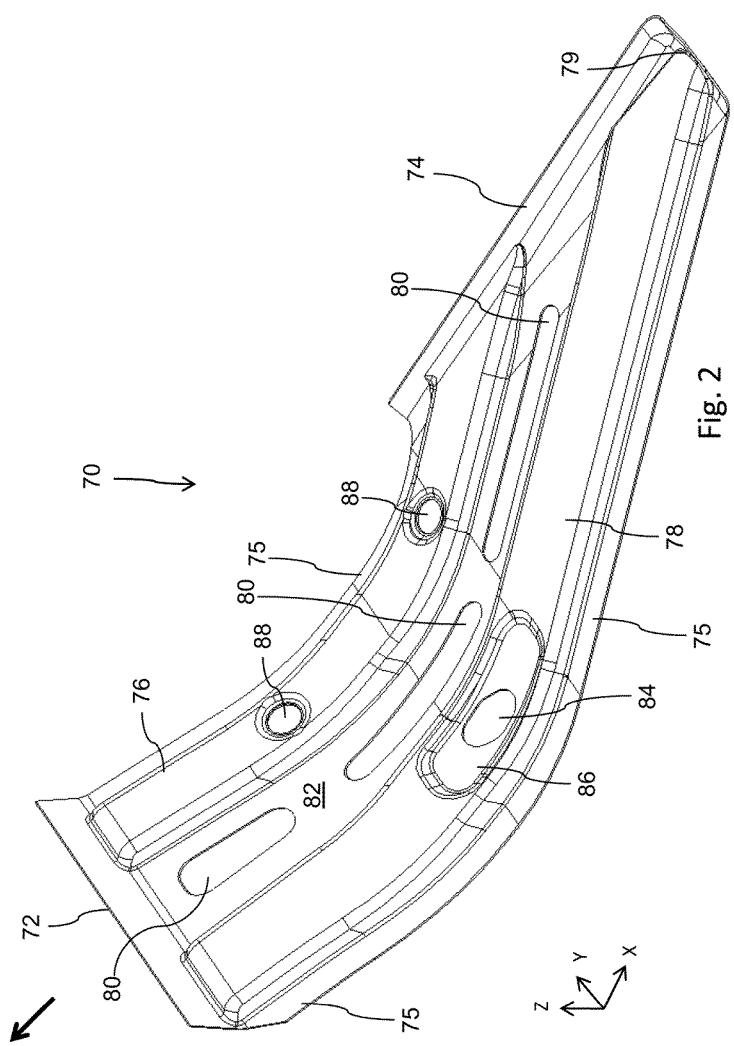
FIG. 2 is an isolated and perspective view of a diagonal reinforcement in accordance with an exemplary embodiment.

The diagonal reinforcement 70 as exemplarily shown in isolation on FIG. 2 exhibits a sheet metal shell contour. It has a front linking flange 72 and a rear or lateral linking flange 74 that extends essentially in the longitudinal direction of the vehicle (x). The rear lateral linking flange 74 here further transitions into a rear linking flange 79 that extends in the transverse direction of the vehicle (y), and is used to join the diagonal reinforcement 70 with the seat cross member 24 in the longitudinal direction of the vehicle (x) too.

In addition, the diagonal reinforcement 70 exhibits two top-hat profiles 76, 78 spaced apart from each other in the transverse direction of the vehicle (y), which are essentially adjusted to the contour of the diagonal reinforcement 70 and trace the latter. These are used to structurally reinforce the diagonal reinforcement 70. The diagonal reinforcement 70 laterally exhibits a flange section 75, which traces the contour of the floor panel 30, 31 in the bulkhead area 34 and foot well area 36, and is provided for attachment to the floor panel 30, 31. Individual recesses 80 are formed in an intermediate or connecting section 82 between the two top-hat profile sections 76, 78, which serve to reduce the weight of the diagonal reinforcement 70.

The top-hat profile sections 76, 78 can also be provided with individual, pocket-like embossed areas 86 or openings 84, 88, wherein the embossed sites 86 directed inwardly toward the underlying floor panel 30, 31 enable a separate connection with the underlying floor panel, while the openings 84, 88 also provide access for possible connecting means, e.g., welding apparatuses, for example so that the underlying floor panel 30, 31 can be structurally connected, preferably welded, with the frame rail 16, 18 lying further underneath.

FIG. 3 shows the reinforcing element 32 to be arranged above the floor panel 31 along with a left diagonal reinforcement 70 and a right diagonal reinforcement 90. The diagonal reinforcement 90 is essentially structured identically to the diagonal reinforcement 70. Let it be noted at this juncture that relevant references numbers 90, 92, 95, 96, 98 cited on FIG. 3 correspond to reference numbers 70, 72, 75, 76, 78.

The reinforcement structure depicted on FIG. 3 is composed of three individual parts, specifically a left diagonal reinforcement 70, a right diagonal reinforcement 90 and a reinforcing element 32 lying in between the latter. The reinforcing elements 32, 70, 90 can already be connected by individual weld spots 52 in advance, meaning before assembled to the floor panel 31 of the motor vehicle, for example along the connecting flange 74, which adjoins a side frame of the reinforcing element 56. The resultant reinforcement structure can then be secured to the floor panel 31 in a single mounting operation during vehicle assembly.

FIGS. 4 to 11 show another embodiment of a reinforcement structure 100, which is already designed as a single piece during its manufacture and fabricated out of a single sheet metal blank, building upon the reinforcement structure depicted on FIG. 3. In this regard, the above reinforcement structure 100 exhibits a front attachment flange 102 that is continuous over the entire width (y), as well as a left diagonal reinforcement section 170 and right diagonal reinforcement section 190, which adjoin a middle reinforcement section 132 on either side.

The individual reinforcement sections 170, 190 here perform a function comparable to that of the diagonal reinforcements 70, 90 and the middle reinforcing element 32. The reference numbers drawn upon for FIGS. 2 and 3 have been increased by the number 100 in the view shown on FIG. 4. The components labeled with the latter here also perform a largely identical function.

Figure 4:
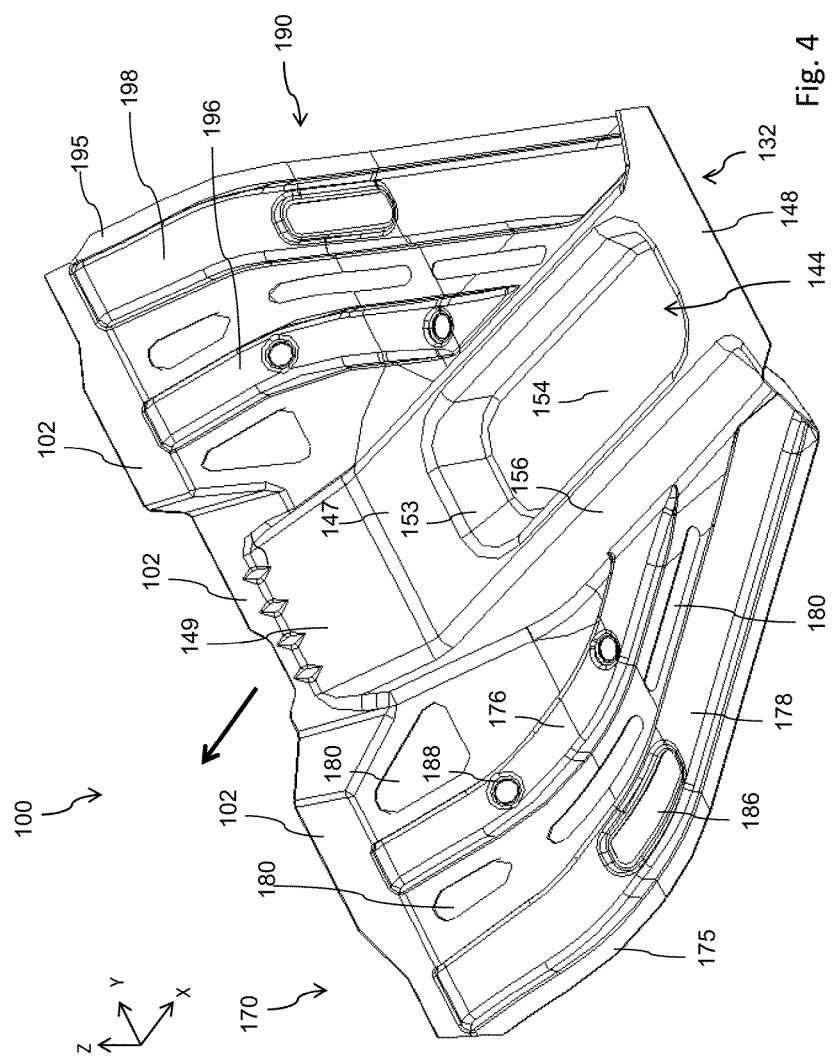
FIG. 4 is a perspective view of a one-piece reinforcement structure in accordance with an exemplary embodiment.

FIGS. 6 and 7 illustrate the position of the reinforcement structure 100 separately depicted on FIG. 4 on the support frame 16, 18, 20, 22, and 24 of the floor structure 10. As evident here, the front linking flange 102 of the reinforcement structure 100 is connected with the bulkhead cross member 20 over nearly its entire transverse extension, and the structure 100 further abuts the seat cross beam 24 toward the back via the lower floor cross beam 22, both downwardly and in the longitudinal direction of the vehicle (x).

Figure 8:
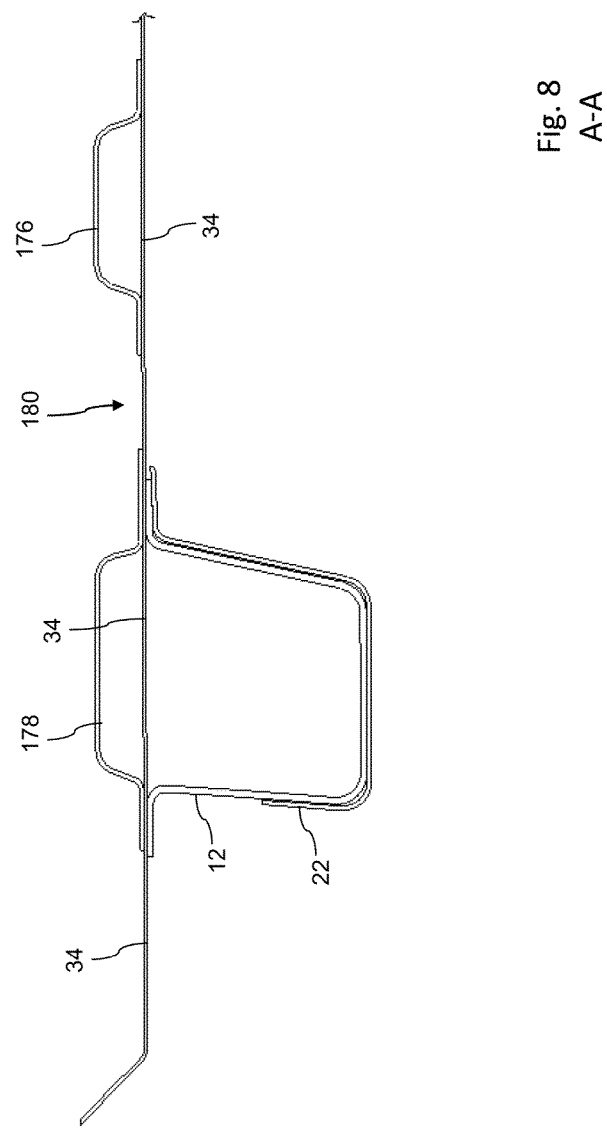
FIG. 8 is a cross section along the cross sectional line A-A according to FIG. 7.

The cross section according to FIG. 8 denotes the overlapping arrangement of the outer profile section 178 of the diagonal reinforcement section 170 in the area of the frame rail 12 or in the area of the front bottom beam 22 adjusted to the frame rail contour. A flange section 175 of the reinforcement profile 178 here ends up nearly overlapping a corresponding linking flange of the frame rail 12. Only the floor panel 34 to be given a comparatively thin-walled design is located between the flange sections.

Further depicted spaced apart from the above in the transverse direction of the vehicle (y) is a recess 180 in the intermediate area 182 between the two profiles 178, 176.

Figure 9:
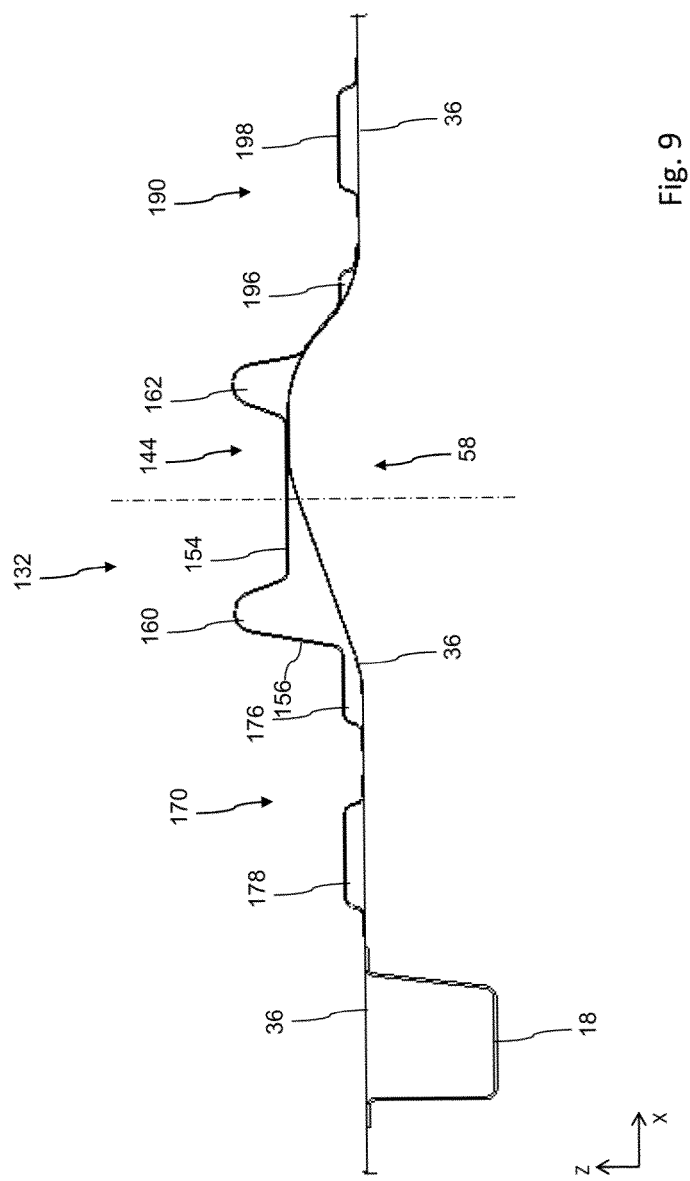
FIG. 9 is a cross sectional view along B-B according to FIG. 7.

FIG. 9 shows a cross section B-B according to FIG. 7 with a floor panel 31 faded out on FIG. 7, and illustrates that the inner reinforcement profiles 176, 196 of the respective diagonal reinforcement sections 170, 190 transition seamlessly into the twin-top-hat contour of the centrally arranged reinforcement section 132 that runs in the longitudinal direction of the vehicle (x). For example, the inner profile section 176 of the left diagonal reinforcement section 170 passes over seamlessly or as a single piece into a lateral frame side structure 156 of the reinforcement section 132.

The latter exhibits a trough section 144 that is provided with a trough floor 154, and bordered by the two edge profiles 160, 162 in the transverse direction of the vehicle. The trough floor 154 can here be separately joined with the underlying floor panel section 36. The floor panel 31 here forms a kind of strike plate both for the underlying frame rail 18 and for the reinforcement structures 178, 176, 160, 154, 162, 196 and 198 with roughly a top-hat profile situated above the floor panel 31. In an embodiment, the floor panel 31 exhibits an upward curvature 58 formed in the vertical direction of the vehicle (z), which comparably to a conventional transmission hump makes it possible to run additional vehicle components under the floor panel 31, like an exhaust system.

Cross section C-C along the reinforcement profile 178 according to FIG. 10 shows that the underlying floor panel section 36 is welded, for example in the area of an opening 184, with the frame rail 12 lying further underneath by means of one or several weld spots 52. Also depicted in this cross section C-C is the twin-chamber-like linkage in the area of the seat cross member 24. The floor panel 36 exhibits a ramp-like structure 37 in the area of the seat cross member 24, and viewed in the longitudinal direction of the vehicle (x) is separately connected with the seat cross member 24 on either side of said ramp structure 37.

In addition, a support section 179 comes to lie above the ramp structure 37 of the floor panel 31. Both weld spots 52 depicted here are preferably designed as triple weld spots, and connect the three sheet metal parts 179, 37, 24.

FIG. 11 shows a longitudinal section D-D through the middle reinforcement area 132. A bulkhead 66 projecting up and away is shown in at least sections of the bulkhead cross member 20 depicted here on the left. The bulkhead panel 66 here forms a strike plate for the roughly L-shaped bulkhead cross member 20.

According to the magnified view on FIG. 11, the bulkhead panel 66 further protrudes at least slightly over the downwardly projecting attachment flange of the bulkhead cross member 20, and there forms a linking extension for both the reinforcement structure 100 and the floor panel 31. The linking flange 42 of the floor panel 31 structurally connects the latter with the bulkhead panel 66 in both the area of the lower and the area of the upper weld spot 52. In this regard, the upper weld spot 52 joins together the bulkhead cross member, floor panel 31 and bulkhead panel 66, while the lower weld spot joins together the bulkhead panel 66, floor panel 31 and reinforcement structure 100.

The inclined top-hat profile section 149 of the middle reinforcement section 132 here forms a closed triangular profile together with the upwardly protruding linking flange 42 and the bulkhead section 34 of the floor panel 31. Further below, in the transitional area to the largely flat foot well section 36, the profile section 147 of the reinforcement section 132 comes to be spaced apart from the floor panel section 36, accompanied by the formation of a hollow section profile.

The formation of the trough contour 144 causes the top-hat profile 147 to transition via a transitional area 153 inclined much like a ramp into a trough floor 154, which is separately joined with the underlying floor panel section 36 by a plurality of individual weld spots 52. Denoted beneath the approximately rhomboid cross sectional profile is the front floor cross member 22, whose L-profile or V-profile is sealed via the foot well section 36 of the floor panel 31.

In much the same way as already explained with respect to FIG. 10, the ramp-like transitional area between the seat linking area 38 and foot well section 36 forms a closed cross sectional profile with the seat cross member 24 in the cross section depicted on FIG. 11 as well. A transitional area 155 from the trough floor 154 to the attachment flange 148 projecting toward the back is here provided, spaced apart and accompanied by the formation of another cavity, wherein the attachment flange 148 and the floor panel 38 are here also connected by way of a triple weld with the seat cross member or an attachment flange molded thereto toward the back.

Whether it be in the form of a separate diagonal reinforcement 70, 90 or in the form of a reinforcement structure 100 designed as a single piece with a middle reinforcement 132, the creation of a diagonal reinforcement makes it possible to structurally reinforce the entire floor structure and vehicle body, and increase their torsional rigidity. Because the diagonal reinforcements 70, 90, 170, 190 adjoin the bulkhead cross member 20 relatively far outside viewed in the transverse direction of the vehicle, any forces acting on the bulkhead or frame rails 12, 14 in this area can be diverted directly into the roughly centrally situated reinforcing element 35, 32, and into the seat cross member 24. Foot well intrusions and deformations in this area can be reduced, in particular to increase vehicle passenger safety. In some cases, the improved or elevated rigidity makes it possible to design additional bearing structure components, along with the floor panel, to have thinner walls, thereby saving on weight.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A floor structure of a motor vehicle body, the floor structure comprising:
   two frame rail arrangements essentially extending in a longitudinal direction of the motor vehicle body;
   a cross member essentially extending in a transverse direction of the motor vehicle body and joining together the two frame rail arrangements;
   a floor panel that extends between the cross member and the two frame rail arrangements;
   a diagonal reinforcement located above the floor panel and abutting against the cross member in the longitudinal direction of the motor vehicle body;
   a reinforcing element that essentially extends in the longitudinal direction of the motor vehicle body between the two frame rail arrangements, wherein the diagonal reinforcement abuts against the reinforcing element in the transverse direction of the motor vehicle body.

2. The floor structure according to claim 1, wherein the diagonal reinforcement and the reinforcing element are secured to the floor panel.

3. The floor structure according to claim 1, wherein the diagonal reinforcement is structurally connected with the cross member by a front attachment flange essentially extending in the transverse direction of the motor vehicle body.

4. The floor structure according to claim 1, wherein the diagonal reinforcement is structurally connected with the reinforcing element by a rear attachment flange essentially extending in the longitudinal direction of the motor vehicle body.

5. The floor structure according to claim 4, wherein the diagonal reinforcement abuts a seat cross member and/or is structurally connected thereto by a rear attachment flange essentially extending in the transverse direction of the motor vehicle body.

6. The floor structure according to claim 1, wherein the diagonal reinforcement proceeds from a front linking region adjoining the cross member and extends rearward, opposite a traveling direction of the motor vehicle body, toward a middle of the motor vehicle body.

7. The floor structure according to claim 6, wherein the diagonal reinforcement exhibits a curved contour at least regionally directed inwardly toward the middle of the motor vehicle body in relation to the transverse direction of the motor vehicle body.

8. The floor structure according to claim 1, wherein the diagonal reinforcement exhibits at least one profile section that is downwardly open toward the floor panel and traces a contour of the diagonal reinforcement.

9. The floor structure according to claim 1, wherein the diagonal reinforcement exhibits lateral and outwardly protruding and/or circumferential attachment flange sections that are secured directly to the floor panel in an assembly position.

10. The floor structure according to claim 1, wherein the diagonal reinforcement exhibits an opening or recess.

11. The floor structure according to claim 1, further comprising two diagonal reinforcements arranged essentially symmetrical to the reinforcing element.

12. The floor structure according to claim 1, wherein the diagonal reinforcement and the reinforcing element are configured as a single piece, and form a reinforcement structure that is placed on the floor panel from above, and is structurally connected with the floor panel as well as with the cross member and a seat cross member.

13. The floor structure according to claim 1, wherein the reinforcing element is designed as a transmission hump integrated into the floor panel, or secured to the floor panel as a separate reinforcing element.

14. A vehicle body with a floor structure comprising:
two frame rail arrangements essentially extending in a longitudinal direction of the vehicle body;
a cross member essentially extending in a transverse direction of the vehicle body and joining together the two frame rail arrangements;
a floor panel that extends between the cross member and the two frame rail arrangements;
a diagonal reinforcement located above the floor panel and abutting against the cross member in the longitudinal direction of the vehicle body;
a reinforcing element that essentially extends in the longitudinal direction of the vehicle body between the two frame rail arrangements, wherein the diagonal reinforcement abuts against the reinforcing element in the transverse direction of the vehicle body.

15. A motor vehicle with a floor structure comprising:
two frame rail arrangements essentially extending in a longitudinal direction of the motor vehicle;
a cross member essentially extending in a transverse direction of the motor vehicle and joining together the two frame rail arrangements;
a floor panel that extends between the cross member and the two frame rail arrangements;
a diagonal reinforcement located above the floor panel and abutting against the cross member in the longitudinal direction of the motor vehicle;
a reinforcing element that essentially extends in the longitudinal direction of the motor vehicle between the two frame rail arrangements, wherein the diagonal reinforcement abuts against the reinforcing element in the transverse direction of the motor vehicle.

\* \* \* \* \*